(12) United States Patent
Tsujimoto

(10) Patent No.: US 6,288,524 B1
(45) Date of Patent: Sep. 11, 2001

(54) DC/DC CONVERTER AND A CONTROLLING CIRCUIT THEREOF

(75) Inventor: Hirokazu Tsujimoto, Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/491,037

(22) Filed: Jan. 25, 2000

(30) Foreign Application Priority Data

Jan. 26, 1999 (JP) .................................................. 11-016394
May 6, 1999 (JP) .................................................. 11-125611

(51) Int. Cl.$^7$ ....................................................... G05F 1/40
(52) U.S. Cl. ............................ 323/285; 323/284; 323/282
(58) Field of Search ..................................... 323/282, 283, 323/222, 284, 285, 287; 363/21, 17, 97, 98, 131, 20

(56) References Cited

U.S. PATENT DOCUMENTS

| | | | |
|---|---|---|---|
| 4,437,146 | * 3/1984 | Carpenter ................................. | 363/21 |
| 5,481,178 | 1/1996 | Wilcox et al. ......................... | 323/287 |
| 5,814,979 | 9/1998 | Grimm ................................... | 323/284 |
| 5,912,552 | 6/1999 | Tateishi ................................. | 323/285 |
| 5,939,871 | 8/1999 | Tanaka ................................... | 323/285 |
| 5,949,226 | 9/1999 | Tanaka et al. ......................... | 323/285 |

* cited by examiner

*Primary Examiner*—Rajnikant B. Patel
(74) *Attorney, Agent, or Firm*—Woodcock Washburn Kurtz Mackiewicz & Norris LLP

(57) ABSTRACT

A pair of switches is alternately turned on or off according to a state of a flip-flop. The flip-flop is set according to a set pulse which is periodically generated by an oscillator, and is reset according to a reset signal output from a comparator. The comparator generates a reset signal when the inductor current signal representing an inductor current becomes larger than the current instruction signal determined based on an output voltage. An offset generating circuit provides an offset to the inductor current signal while a switch is OFF.

8 Claims, 10 Drawing Sheets

US 6,288,524 B1

DC/DC CONVERTER AND A CONTROLLING CIRCUIT THEREOF

BACKGROUND OF THE INVENTION

1. Field of the Invention

The present invention relates to a DC/DC converter and a controlling method thereof, and more particularly to a current-mode DC/DC converter.

2. Description of the Related Art

A DC/DC converter is a device for converting a certain DC voltage into a different DC voltage, and is used in various fields.

FIG. 1 is a circuit diagram of a conventional DC/DC converter. This DC/DC converter operates with PWM (Pulse-Width Modulation), and is sometimes called a switching regulator. This DC/DC converter monitors an electric current flowing through an inductor, and adjusts an output DC voltage based on the current.

Switches M1 and M2 are, for example, a pair of MOS transistors which are connected in series and are respectively turned on or off according to the driving signals $V_U$ and $V_L$ provided from a driving circuit 101. An input voltage $V_{in}$ is applied to the switch M1, while the switch M2 is grounded.

Fundamentally, the switches M1 and M2 are alternately turned on or off according to the state of a flip-flop 102. When the flip-flop 102 is in a set state, the switch M1 is ON and switch M2 is OFF, and an inductor current $I_L$ which flows via an inductor L increases (ramps up). If the flip-flop 102 is in a reset state, the switch M1 is OFF and switch M2 is ON, and the inductor current $I_L$ decreases (ramps down). An output capacitor $C_{out}$ is arranged to smooth an output voltage.

In this DC/DC converter, the output voltage $V_{out}$ and the inductor current $I_L$ are used as feedback signals for controlling the switches M1 and M2. An error amplifier 103 amplifies the difference between the output voltage $V_{out}$ (or a voltage obtained by dividing the output voltage $V_{out}$ with a resistor network composed of resistors R1 and R2) and a predetermined reference voltage $V_{ref}$, and outputs the amplified difference as a current instruction signal $I_{cont}$. A comparator 104 makes a comparison between an inductor current signal $I_{curr}$ representing the inductor current $I_L$ and the current instruction signal $I_{cont}$ output from the error amplifier 103. Then, the comparator 104 outputs the result of the comparison as a reset signal $V_{res}$.

An oscillator 105 generates a set signal. The set signal is a pulse signal which is synchronous with the oscillation frequency of the oscillator 105. The set signal is input to the set terminal of the flip-flop 102 via an AND gate (one of whose inputs is a negative logic) 106, while the reset signal from the comparator 104 is input to the reset terminal of the flip-flop 102.

Next, the operations of the DC/DC converter are explained by referring to FIG. 2. Upon receipt of the set pulse from the oscillator 105, the flip-flop 102 enters the set state. When the flip-flop 102 enters the set state, the driving signal $V_L$ is changed from "H" to "L" and the driving signal $V_U$ is changed from "L" to "H". As a result, the switch M2 is turned off and switch M1 is turned on. Then, the inductor current $I_L$ starts to increase.

When the inductor current signal $I_{curr}$ representing the inductor current $I_L$ reaches the current instruction signal $I_{cont}$ being the output of the error amplifier 103, the output of the comparator 104 is changed from "L" to "H", and is provided to the reset terminal of the flip-flop 102.

Upon receipt of "H" at the reset terminal, the flip-flop 102 enters the reset state. When the flip-flop 102 enters the reset state, the driving signal $V_U$ is changed from "H" to "L" and the driving signal $V_L$ is changed from "L" to "H". Consequently, the switch M1 is turned off and the switch M2 is turned on. Then, the inductor current $I_L$ starts to decrease. Thereafter, the above described operations are repeated when the next set pulse is generated by the oscillator 105 and the generated set pulse is input to the set terminal of the flip-flop 102. That is, the DC/DC converter fundamentally repeats the above described operations in synchronization with the oscillation frequency of the oscillator 105.

As described above, with the DC/DC converter shown in FIG. 1, the output voltage $V_{out}$ is held constant by controlling the inductor current $I_L$ with the use of the current instruction signal $I_{cont}$ generated based on the output voltage $V_{out}$. The output voltage to be held by this DC/DC converter is determined by the reference voltage $V_{ref}$.

Fundamentally, the switches M1 and M2 are alternately turned on and off. However, if these two switches are simultaneously ON, their elements can possibly be destroyed by a large current. Accordingly, what is called a dead time is provided to the driving signals $V_u$ and $V_L$ in order to prevent the switches M1 and M2 from being simultaneously ON.

Normally, noise occurs in a DC/DC converter when a switch is turned on or off, and frequently causes erroneous operations. A problem caused by the noise at the switching timing is described next by referring to FIG. 3.

At a time T1, the set pulse of the set signal is generated and provided to the set terminal of the flip-flop 102. Here, the AND gate 106 is assumed to be open at the time T1.

When the flip-flop 102 enters the set state according to this set pulse, the inductor current $I_L$ then starts to increase as described above. When the inductor current signal $I_{curr}$ representing the inductor current $I_L$ reaches the current instruction signal $I_{cont}$, the output of the comparator 104 (reset signal) is changed from "L" to "H". Because a circuit delay exists, a predetermined amount of time is required from when the inductor current signal $I_{curr}$ exceeds the current instruction signal $I_{cont}$ until when the reset signal is actually changed from "L" to "H".

When the reset signal is changed to "H", the flip-flop 102 enters the reset state and the inductor current $I_L$ then starts to decrease as described above.

When the next pulse is generated and the flip-flop 102 is changed from the reset state to the set state at a time T3, the driving signal $V_L$ for controlling the switch M2 is changed from "H" to "L". As a result, the switch M2 is turned off. In the meantime, the dead time is arranged for the driving signal $V_U$ for controlling the switch M1. Therefore, the switch M1 remains OFF.

When the switch M2 is turned off, noise occurs in the inductor current signal $I_{curr}$. Furthermore, if the inductor current signal $I_{curr}$ exceeds the current instruction signal $I_{cont}$ due to this noise, the reset signal is changed from "L" to "H". However, the predetermined amount of time is required from when the inductor current signal $I_{curr}$ exceeds the current instruction signal $I_{cont}$ until when the reset signal is actually changed from "L" to "H", as described above. Therefore, the reset signal is changed from "L" to "H" at a time T5.

In the meantime, the driving signal $V_U$ for controlling the switch M1 is changed from "L" to "H" at the timing (time T4) when the dead time elapses from the time T3. Accordingly, in this case, the switch M1 is immediately turned off at the time T5 after being turned on at the time T4. Namely, in this case, the inductor current $I_L$ continues to decrease after the time T5 until the next set pulse is generated at a time T6.

When the next set pulse is generated at the time T6 after that, the flip-flop 102 is changed from the reset state to the set state and the inductor current $I_L$ continues to increase until the inductor current signal $I_{curr}$ reaches the current instruction signal $I_{cont}$.

When noise, etc. occurs in the signal for controlling the switch M1 or M2 as described above, the inductor current $I_L$ may sometimes become unstable. That is to say, the inductor current $I_L$ regularly change in an ideal state where no noise occurs, as shown in FIG. 2. However, the inductor current $I_L$ may irregularly change in some cases when noise occurs, as shown in FIG. 3. Since the time period during which the switch M1 is ON becomes shorter than that of a normal operation according to the reset pulse generated due to noise in the example shown in FIG. 3, a sufficient inductor current $I_L$ does not flow from the time T3 to the time T6. Therefore, the switch M1 is held ON during a time period which is longer than that of a normal operation so as to make up for the insufficient inductor current $I_L$ after the time T6. Consequently, the fluctuations of the inductor current $I_L$ become significant, which leads to an increase in the fluctuations of the output voltage $V_{out}$ (ripple voltage).

In the example provided above, the driving signal $V_U$ for controlling the switch M1 is changed from "L" to "H" before the reset pulse is generated due to noise. However, depending on the relationship between the dead time and the delay time of the comparator 104 and so on, the reset pulse is generated before the driving signal $V_U$ is changed from "L" to "H". In this case, the set pulse is not provided to the flip-flop 102 in the configuration comprising a reset preceding circuit (AND gate 106) like the DC/DC converter shown in FIG. 1, and the switch M1 is not turned on. As a result, the switching cycle temporarily becomes longer also in this case, and the ripple of the output voltage becomes large.

In recent years, the tolerable value of the ripple, which is demanded by a load, has become stricter. Accordingly, it is vital to reduce the ripple of the output voltage of a DC/DC converter.

SUMMARY OF THE INVENTION

The present invention aims at overcoming the above described problem, and at providing a DC/DC converter for allowing a stable output voltage with a small ripple.

A DC/DC converter according to the present invention comprises a switch for supplying a current and an inductor arranged between the switch and an output terminal, and comprises the following circuits.

A first signal generating circuit generates a signal for turning on the switch. A second signal generating circuit generates a signal for turning off the switch when an electric current flowing via the inductor becomes larger than the instruction value determined based on an output voltage. An offset circuit provides an offset to at least one of the input signals compared by the second signal generating circuit at the time of or after the switch is turned off.

In the above described configuration, an inductor current continues to increase while the switch is ON, and continues to decrease while the switch is OFF. Thus, the phenomenon that the inductor current becomes larger than the instruction value determined by an output voltage must occur during the inductor current increases. That is to say, the second signal generating circuit must generate the signal for turning off the switch only when the switch is ON. In other words, while the switch is OFF, a signal for turning off the switch cannot be generated.

With the DC/DC converter according to the present invention, an offset is provided to at least one of two input signals (such as a signal representing the inductor current and the instruction value) compared by the second signal generating circuit, at the time or after the switch is turned off. Here, if the offset is determined such that the signal representing the inductor current does not reach the instruction value even when noise occurs in this signal, the signal for turning off the switch is never erroneously generated in a time period during which such signal canot be generated. As a result, the inductor current becomes stable, and the ripple of an output voltage becomes smaller.

DESCRIPTION OF THE PREFERRED EMBODIMENTS

Figure 4:
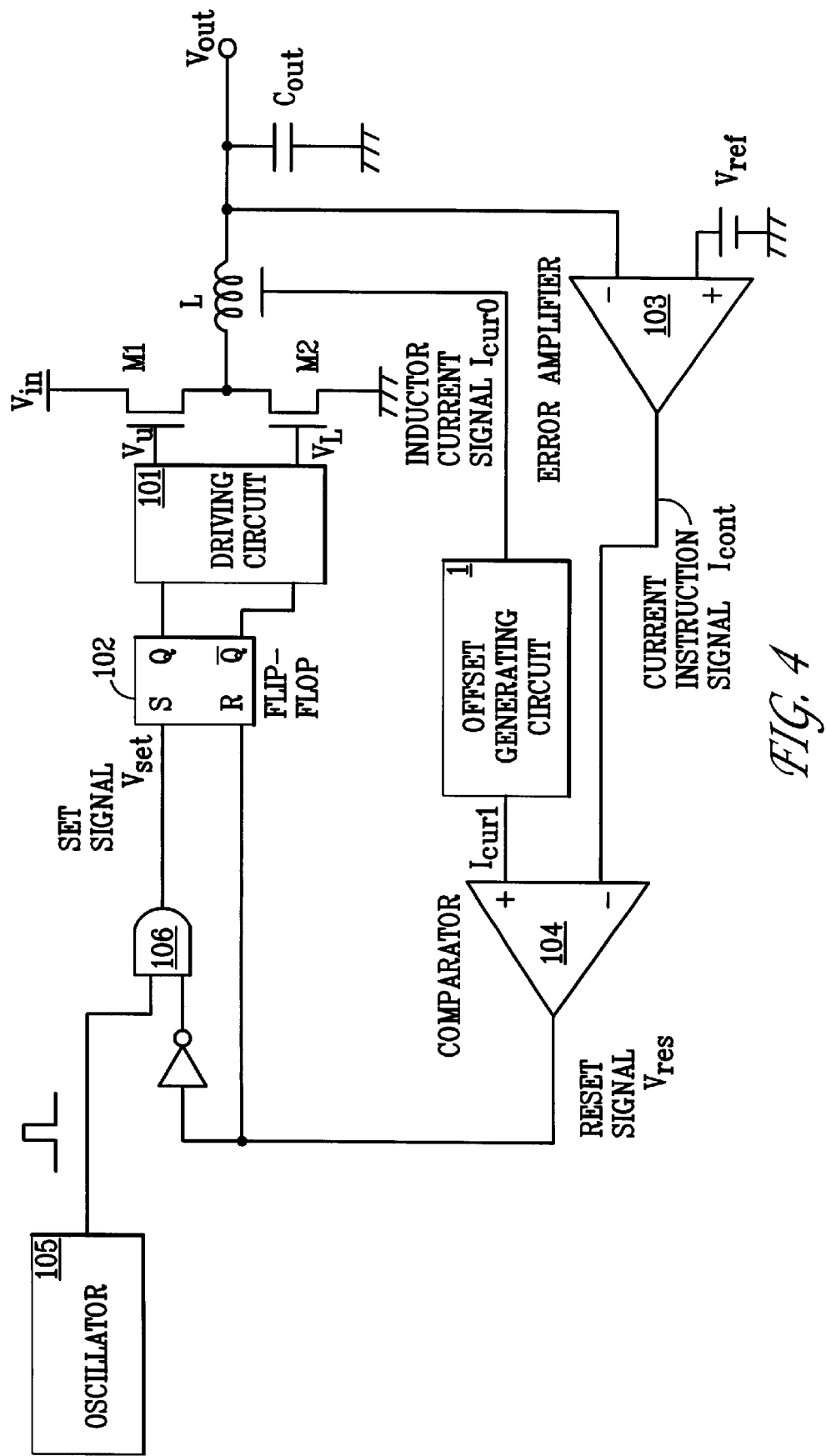
FIG. 4 is a circuit diagram of a DC/DC converter according to a preferred embodiment of the present invention.

FIG. 4 is a circuit diagram of a DC/DC converter according to a preferred embodiment of the present invention. In FIG. 4, the same reference numerals as those shown in FIG. 1 denote the same circuit elements.

Figure 1:
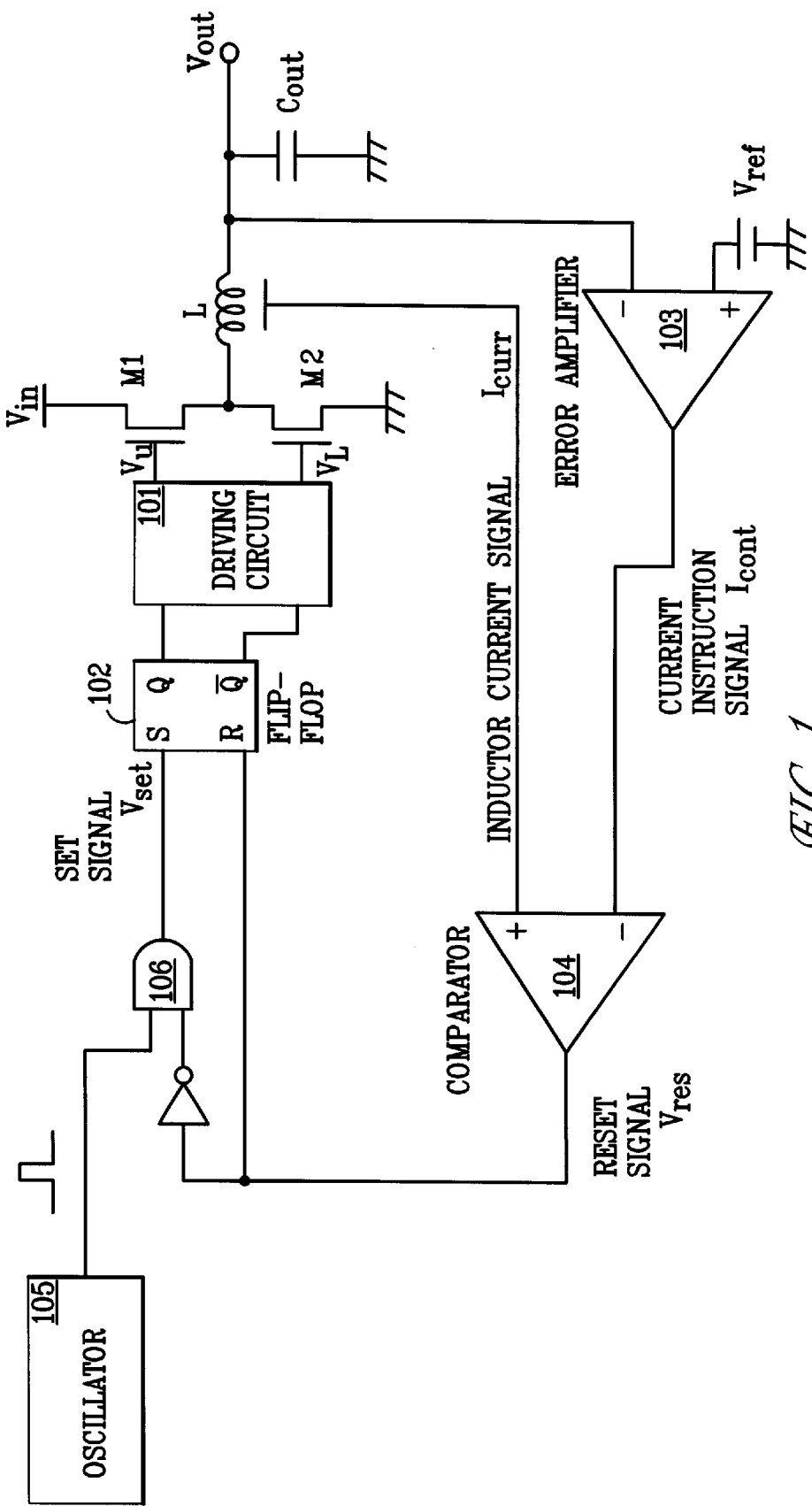
FIG. 1 is a circuit diagram of a conventional DC/DC converter.
Figure 2:
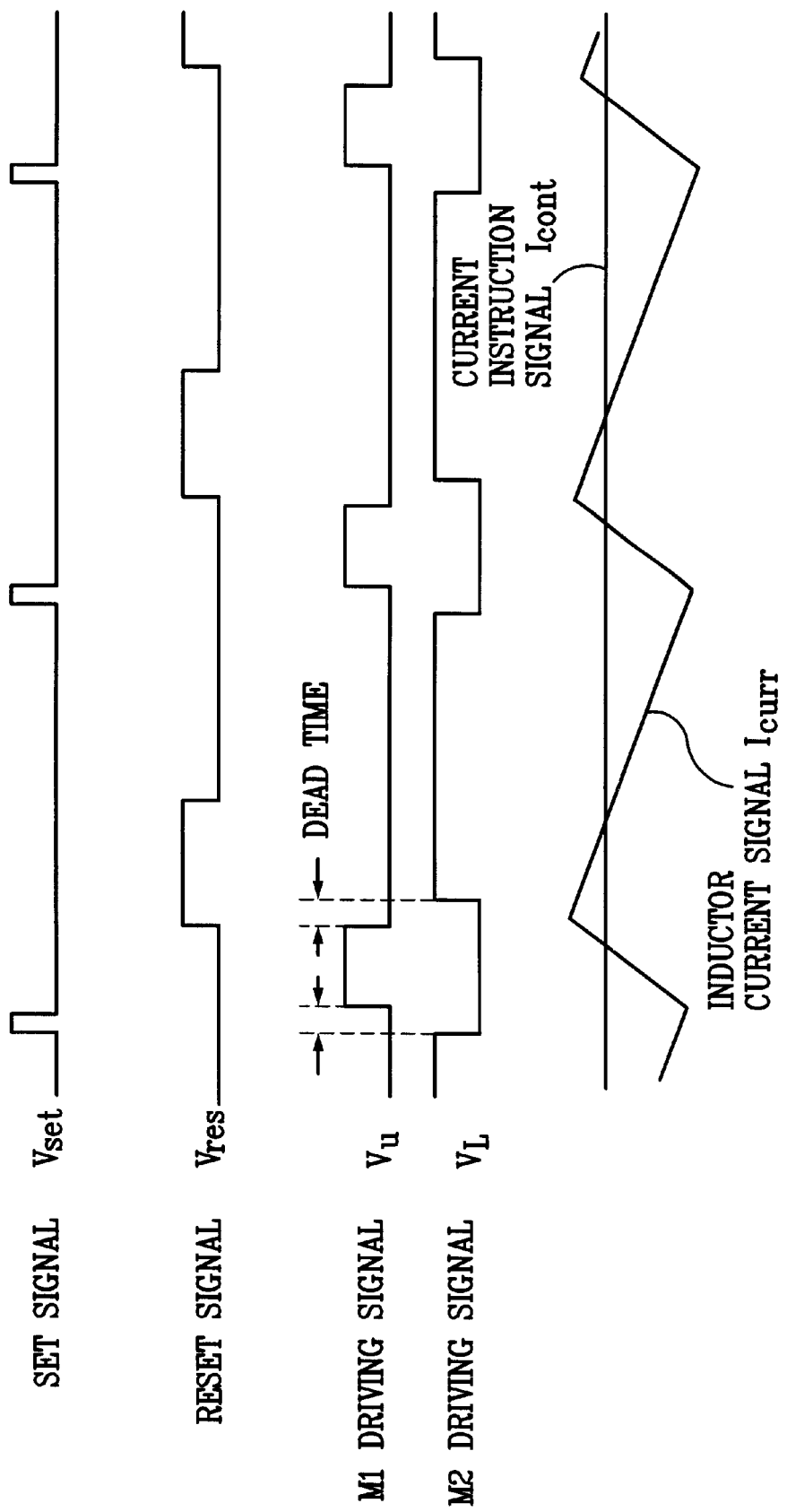
FIG. 2 explains the fundamental operations of the conventional DC/DC converter shown in FIG. 1.

The DC/DC converter according to this preferred embodiment is implemented by adding an offset generating circuit 1 to the DC/DC converter shown in FIG. 1. This offset generating circuit 1 is a circuit which provides an offset to an inductor current signal $I_{cur0}$ representing an inductor current $I_L$ at predetermined timing. That is to say, the offset generating circuit 1 adds an offset at predetermined timing to the inductor current signal $I_{cur0}$ which is compared with an current instruction signal $I_{cont}$ by a comparator 104. Hereinafter, the signal representing the inductor current $I_L$ is referred to as an inductor current signal $I_{cur0}$, while the signal to which the offset is added by the offset generating circuit 1 is referred to as an inductor current signal $I_{cur1}$. The comparator 104 compares the inductor current signal $I_{cur1}$ and the current instruction signal $I_{cont}$.

Figure 5:
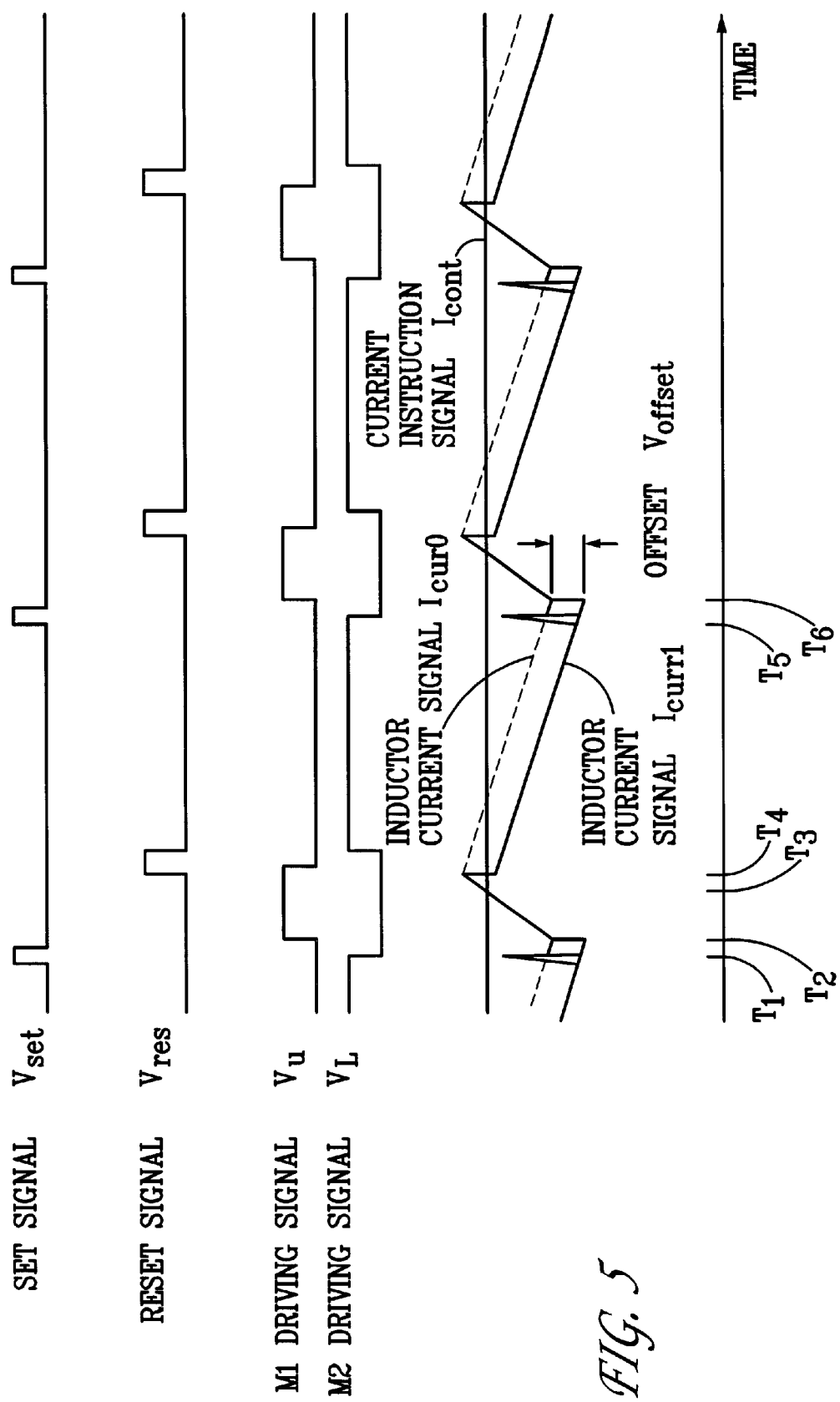
FIG. 5 explains the operations of the DC/DC converter according to the preferred embodiment.

Next, the operations of the DC/DC converter according to this preferred embodiment are explained by referring to FIG. 5. The configuration of the DC/DC converter according to this preferred embodiment (an error amplifier 103, a comparator 104, an oscillator 105, etc.), which is intended for generating the signals for turning on and off the switches M1 and M2, is the same as that of the conventional DC/DC converter shown in FIG. 1.

The set pulse of a set signal is output from the oscillator 105 at a time T1. This set pulse is input to the set terminal of the flip-flop 102. Here, the AND gate 106 is assumed to be open at the time T1. The switches M1 and M2 are respectively assumed to be OFF and ON at the time T1.

The flip-flop 102 enters a set state according to the set pulse, and its Q-output is changed to "H". When the Q-output of the flip-flop 102 becomes "H", the switch M2 is turned off. Then, the switch M1 is turned on at a time T2. The timing difference between these turn-off and turn-on is a dead time.

When the switch M1 is turned on at the time T2, an inductor current $I_L$ then starts to increase. Accompanying this, the inductor current signal $I_{cur0}$ also starts to increase. As will be described later, the offset generating circuit 1 operates in synchronization with the driving signal $V_U$ for controlling the switch M1. That is to say, while the driving signal $V_U$ is "H", the offset generating circuit 1 provides "0" to the inductor current signal $I_{cur0}$. On the other hand, while the driving signal $V_U$ is "L", the offset generating circuit 1 provides a predetermined offset to the inductor current signal $I_{cur0}$. Accordingly, after the time T2 in the example shown in FIG. 5, the offset generating circuit 1 outputs the inductor current signal $I_{cur0}$ as the inductor current signal $I_{cur1}$ unchanged until the driving signal $V_U$ is changed from "H" to "L".

When the inductor current signal $I_{cur1}$ reaches the current instruction signal $I_{cont}$ at a time T3, the output (reset signal) of the comparator 104 is changed from "L" to "H". When the reset signal becomes "H", the AND gate 106 is closed and the flip-flop 102 enters a reset state. When the AND gate 106 is closed, a set signal is prevented from being input to the flip-flop 102. Notice that the AND gate 106 is open when the inductor current signal $I_{cur1}$ becomes smaller than the current instruction signal $I_{cont}$.

When the flip-flop 102 enters the reset state, its Q-output becomes "L" and the driving signal $V_U$ is changed from "H" to "L" at a time T4. After that, the driving signal $V_L$ is changed from "L" to "H". As a result, the switch M1 is turned off and the switch M2 is turned on. Consequently, the inductor current $I_L$ then starts to decrease. The time lag between when the inductor current signal $I_{cur1}$ reaches the current instruction signal $I_{cont}$ and when the driving signal $V_U$ is changed from "H" to "L" arises due to a circuit delay of the comparator 104, etc.

When the driving signal $V_U$ is changed from "H" to "L" at the time T4, the offset generating circuit 1 provides an offset $V_{offset}$ to the inductor current signal $I_{cur0}$. Specifically, for example, the inductor current signal $I_{cur1}$ is obtained by decreasing the voltage level of the inductor current signal $I_{cur0}$ by the offset $V_{offset}$. As the inductor current decreases after the time T4, the inductor current signals $I_{cur0}$ and $I_{cur1}$ also decrease.

The oscillator 105 generates the next set pulse at a time T5. When the flip-flop 102 enters the set state according to this set pulse, the driving signal $V_L$ is again changed from "H" to "L", so that the switch M2 is turned off. At this switching timing, noise usually occurs.

Noise resulting from this turn-off occurs in the inductor current signals $I_{cur0}$ and $I_{cur1}$. However, at the time T5, the driving signal $V_U$ is "L", and the offset generating circuit 1 makes the inductor current signal $I_{cur1}$ lower than the inductor current signal $I_{cur0}$ by the offset $V_{offset}$. Accordingly, even if noise due to the switching occurs at the time T5, the inductor current signal $I_{cur1}$ never reaches the current instruction signal $I_{cont}$, and the reset signal is held to be "L". Namely, an erroneous reset signal due to noise is not generated.

When the dead time elapses from when the driving signal $V_L$ is changed from "H" to "L", the driving signal $V_U$ is changed from "L" to "H" at a time T6. When the driving signal $V_U$ is changed from "L" to "H", the switch M1 is turned on. Then, the offset generating circuit 1 provides "0" to the inductor current signal $I_{cur0}$ as the offset.

The operations after the time T6 are the same as the above described operations during the time T2 through the time T5. Namely, the switches M1 and M2 are turned on or off according to the state of the flip-flop 102. The flip-flop 102 is set according to the set pulse which is periodically generated by the oscillator 105, and is reset by the reset signal output from the comparator 104. The comparator 104 generates the reset signal based on the result of the comparison made between the inductor current signal $I_{cur0}$ representing the inductor current $I_L$ and the current instruction signal $I_{cont}$, while the switch M1 is ON. In the meantime, the comparator 104 generates the reset signal based on the result of the comparison made between the inductor current signal $I_{cur1}$ which is obtained by decreasing the inductor current signal $I_{cur0}$ by the offset $V_{offset}$ and the current instruction signal $I_{cont}$, while the switch M1 is OFF.

Unlike the conventional DC/DC converter shown in FIG. 1, the DC/DC converter according to this preferred embodiment eliminates the noise influence on the signals for generating a reset signal. Therefore, the switches M1 and M2 operate at a constant switching frequency which is synchronous with the oscillation frequency of the oscillator 105. As a result, the inductor current $I_L$ periodically changes, so that the ripple of the output voltage $V_{out}$ becomes small. Additionally, since the frequency of the noise which occurs when the switches M1 and M2 are turned on/off becomes constant, it is easy to remove the noise. Furthermore, since the offset is "0" while the inductor current $I_L$ increases, the reset signal is generated at the same inductor current level as that of an existing DC/DC converter. Accordingly, the DC/DC converter according to this preferred embodiment can be implemented by merely adding the offset generating circuit 1 to an existing DC/DC converter without modifying its design.

Figure 6:
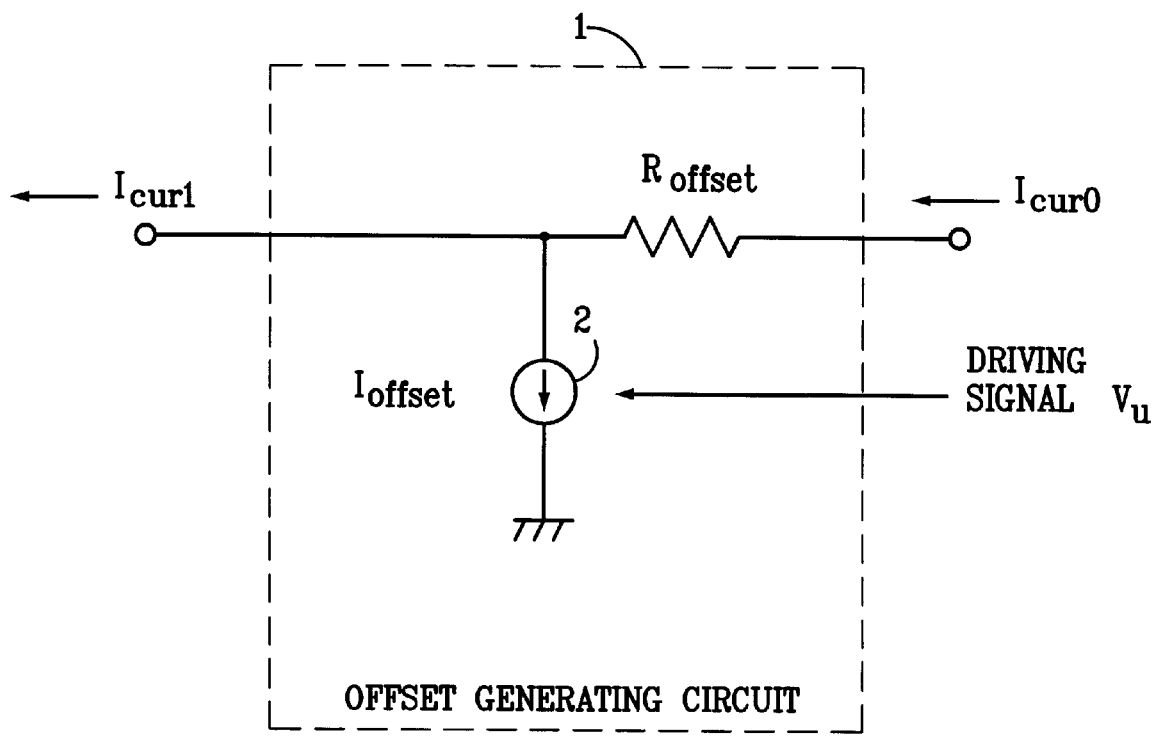
FIG. 6 is a circuit diagram of an offset generating circuit.

FIG. 6 is a circuit diagram of the offset generating circuit 1. The offset generating circuit 1 is composed of a constant current source 2 and a resistor. The constant current source 2 is controlled by the driving signal $V_U$ for controlling the switch M1. Namely, the constant current source 2 flows no current while the driving signal $V_U$ is "H", and flows a current $I_{offset}$ while the signal is "L". Accordingly, the potential of the inductor current signal $I_{cur1}$ is substantially the same as that of the inductor current signal $I_{cur0}$ while the switch M1 is ON. On the other hand, the potential of the inductor current signal $I_{cur1}$ is obtained by decreasing the potential of the inductor current signal $I_{cur0}$ by $R_{offset} * I_{offset}$, while the switch M1 is OFF. The value of the offset is determined by the current generated by the constant current source 2 and the resistance value of the resistor $R_{offset}$ as is evident from the above described configuration.

Figure 7:
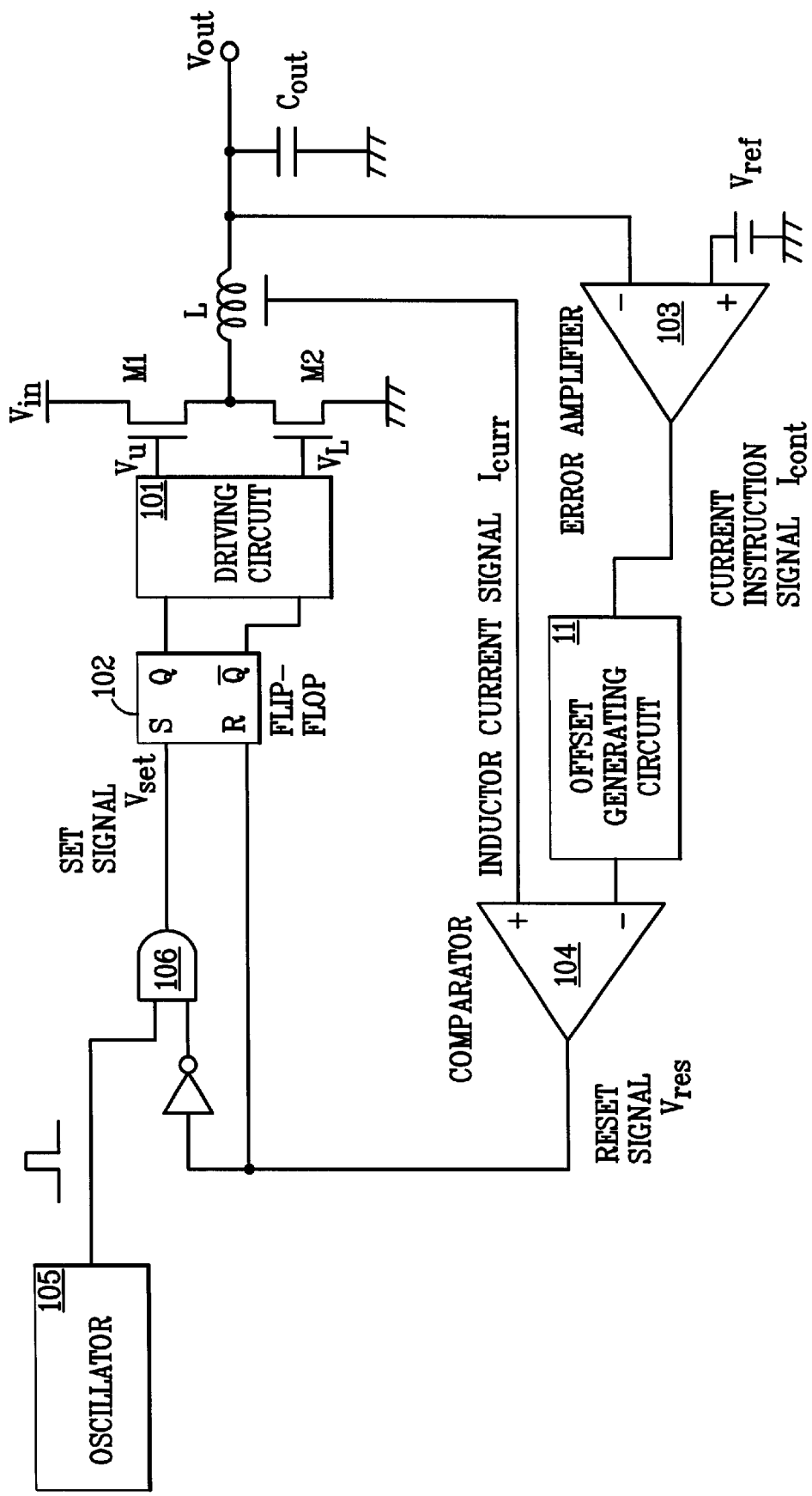
FIG. 7 is circuit diagram of a DC/DC converter according to another preferred embodiment of the present invention.

FIG. 7 is a circuit diagram of a DC/DC converter according to another preferred embodiment of the present invention. In the DC/DC converter shown in FIG. 4, the offset is provided to the inductor current signal $I_{cur0}$. However, in the DC/DC converter shown in FIG. 7, the offset is provided to the current instruction signal $I_{const}$. The offset is generated by an offset generating circuit 11.

Figure 8:
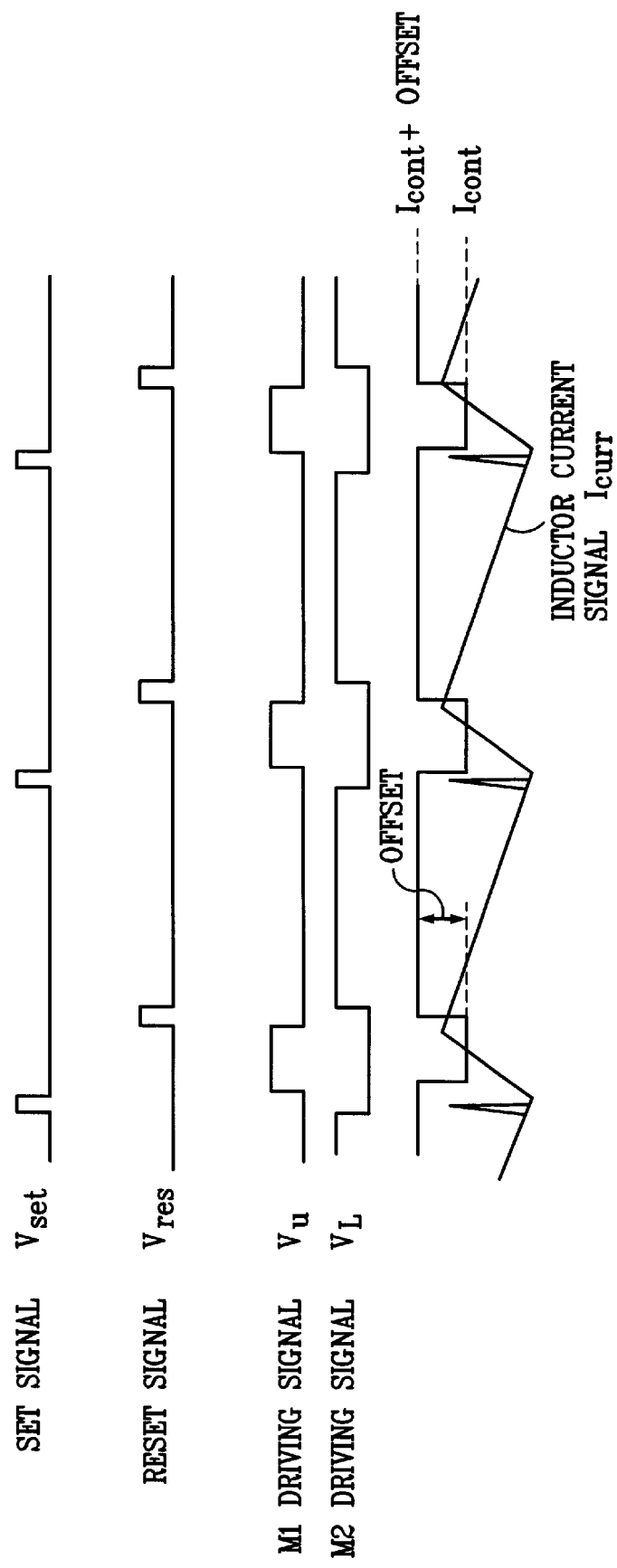
FIG. 8 explains the operations of the DC/DC converter shown in FIG. 7.

FIG. 8 explains the operations of the DC/DC converter shown in FIG. 7. Its fundamental operations are the same as those of the DC/DC converter shown in FIG. 4.

The offset generating circuit 11 adds "0" to the current instruction signal $I_{cont}$ and provides it to the comparator 104 while the switch M1 is ON. On the other hand, the offset generating circuit 11 adds the offset to the current instruction signal $I_{cont}$ and provides the signal to the comparator 104, while the switch M1 is OFF. As a result, the offset is being added to the current instruction signal $I_{cont}$ at the timing when the switch M2 is turned off (the timing when the driving signal $V_L$ is changed from "H" to "L"). Accordingly, there is no influence on the comparison operation of the comparator 104 even if noise occurs due to the turn-off of the switch 2. Consequently, the generation of the reset signal due to noise can be prevented, whereby a stable inductor current $I_L$ can be obtained in a similar manner as in the DC/DC converter shown in FIG. 4, and the ripple of the output voltage $V_{out}$ becomes small.

The above described preferred embodiments refer to the step-down DC/DC converters. However, the present invention is not limited to these implementations. For example, the present invention is applicable to a step-up DC/DC converter.

Figure 9:
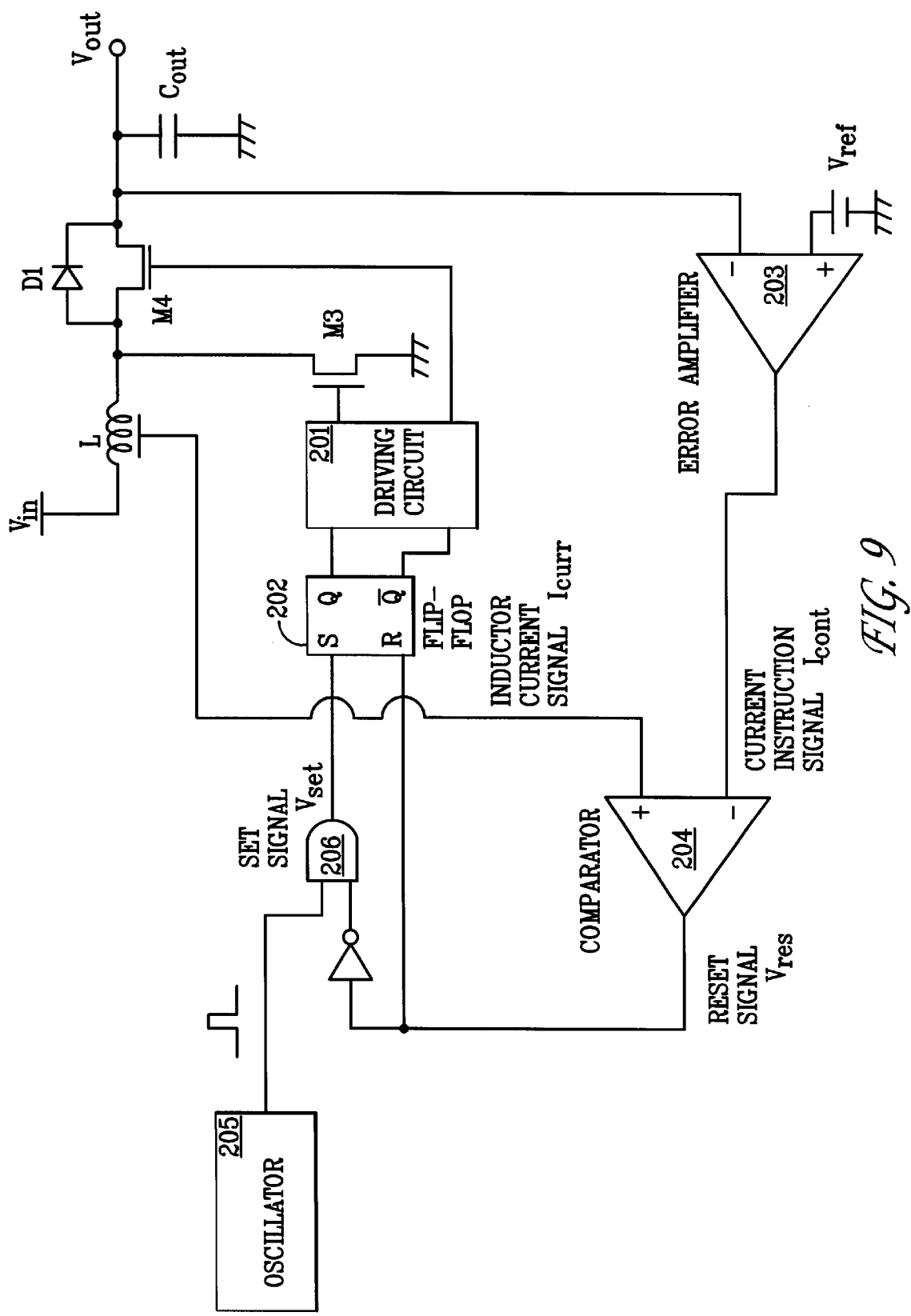
FIG. 9 is a circuit diagram of a typical step-up DC/DC converter.

FIG. 9 is a circuit diagram of a typical existing current-mode step-up DC/DC converter. The configuration of the step-up DC/DC converter is similar to the step-down DC/DC converter shown in FIG. 1 in many points. Namely, a driving circuit 201, a flip-flop 202, an error amplifier 203, a comparator 204, an oscillator 205, and an AND gate 206 respectively correspond to the driving circuit 101, the flip-flop 102, the error amplifier 103, the comparator 104, the oscillator 105, and the AND gate 106, which are shown in FIG. 1.

In the step-up DC/DC converter shown in FIG. 9, an input voltage $V_{in}$ is applied to an inductor L. A switch M3 is arranged between the inductor L and a ground, while a switch M4 is arranged between the inductor L and an output terminal. The switches M3 and M4 are controlled according to the state of the flip-flop 202. Namely, while the flip-flop 202 is in a set state, the switches M3 and M4 are respectively held ON and OFF. While the flip-flop 202 is in a reset state, the switches M3 and M4 are respectively held OFF and ON. Additionally, a diode is connected to the switch M4 in parallel thereto, and an output capacitor $C_{out}$ is arranged for the output terminal.

In this step-up DC/DC converter, the procedure for generating a set signal intended for setting the flip-flop 202 by the oscillator 205, the procedure for generating a rest signal intended for resetting the flip-flop 202 when the inductor current flowing via the inductor L exceeds the instruction value generated based on the output voltage $V_{out}$, and the procedure for setting or resetting the flip-flop 202 according to the set signal and the reset signal are fundamentally the same as those explained by referring to FIG. 1. Note that, however, in this step-up DC/DC converter, the switches M3 and M4 are respectively held ON and OFF and energy is stored in the inductor L, while the flip-flop 202 is in the set state. If the flip-flop enters the reset state, the switches M3 and M4 are respectively held OFF and ON, and the energy stored in the inductor L is provided to the output terminal via the switch M4.

Figure 3:
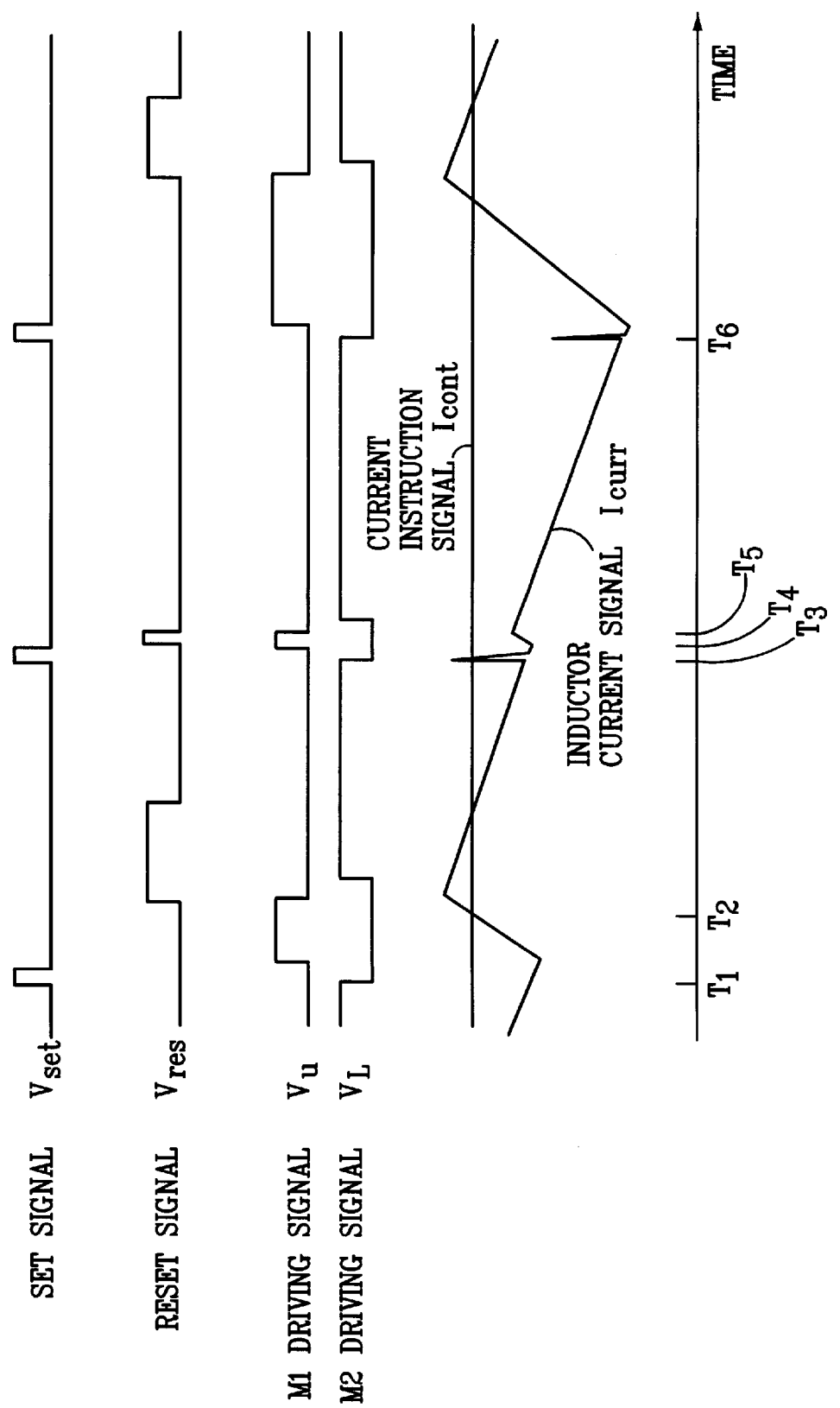
FIG. 3 explains the problems of the conventional DC/DC converter shown in FIG. 1.

Also in this step-up DC/DC converter, the problems described by referring to FIG. 3 can possibly occur similar to an existing step-down DC/DC converter. That is to say, a switching noise can cause erroneous operations.

Figure 10:
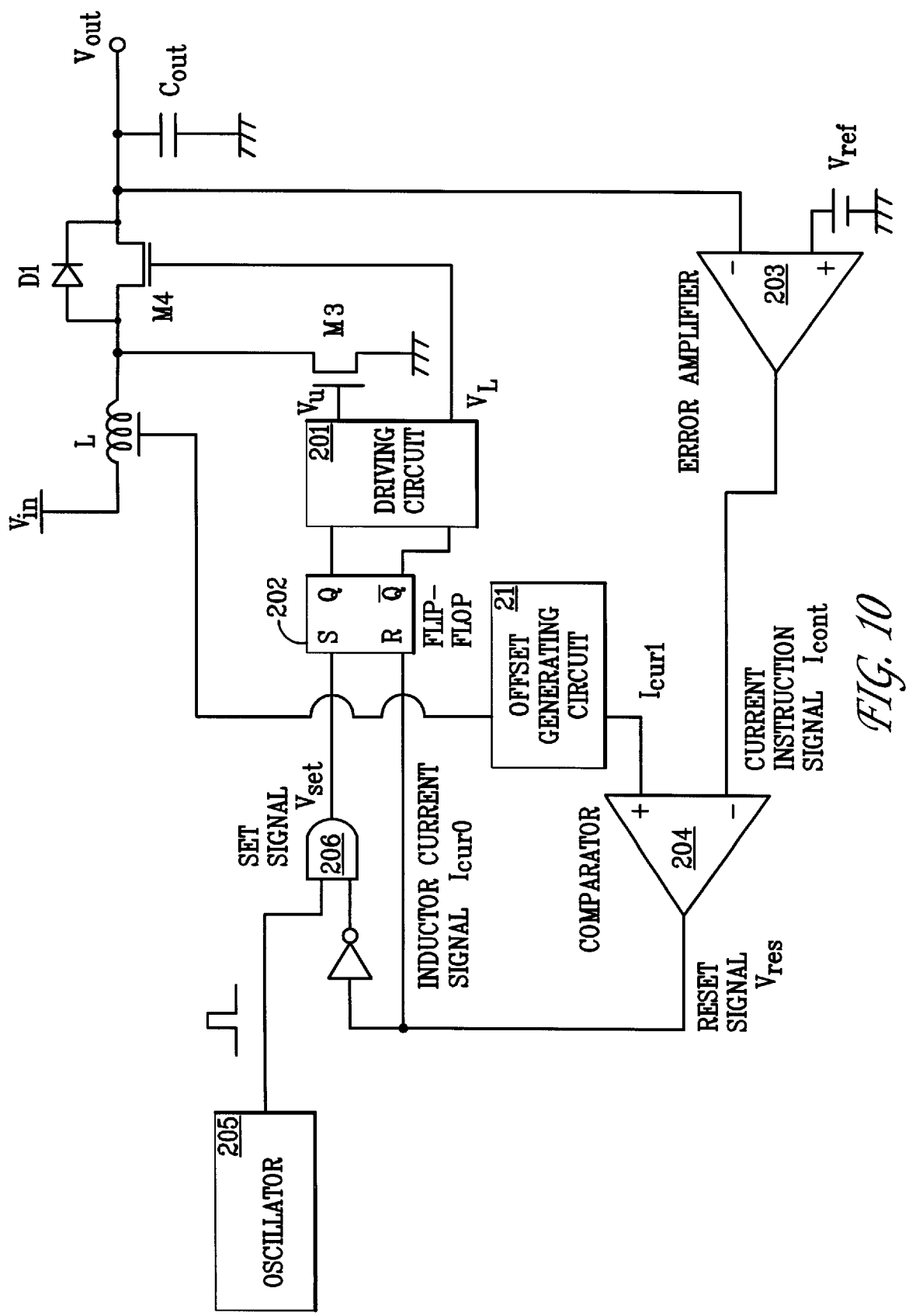
FIG. 10 is a circuit diagram of a step-up DC/DC converter to which the present invention is applied.

FIG. 10 is a circuit diagram of a step-up DC/DC converter to which the present invention is applied. This DC/DC converter is implemented by adding an offset generating circuit 21 to the DC/DC converter shown in FIG. 9. This offset generating circuit 21 generates an inductor current signal $I_{cur1}$ by providing an offset to the inductor current signal $I_{cur0}$ representing the inductor current $I_L$ at predetermined timing. Accordingly, the comparator 204 compares the inductor current signal $I_{cur1}$ with the current instruction signal $I_{cont}$.

The offset generating circuit 21 is fundamentally the same as the offset generating circuit 1 arranged in the step-down DC/DC converter shown in FIG. 4, and is controlled by the driving signal $V_U$ for driving the switch M3. The DC/DC converter shown in FIG. 10 comprises the offset generating circuit 21 for providing an offset to the inductor current signal $I_{cur0}$. However, the DC/DC converter may comprise a circuit for providing an offset to the current instruction signal $I_{cont}$ in place of the offset generating circuit 21 as another implementation. That is to say, a negative offset may be provided to one of the signals to be input to the comparator 204 instead of providing a positive offset to the other signal also in the step-up DC/DC converter.

According to the present invention, since a switch control is not influenced by noise in a current-mode DC/DC converter, the inductor current becomes stable and the ripple of an output voltage of the DC/DC converter is small.

What is claimed is:

1. A DC/DC converter having a switch for supplying current and an inductor arranged between the switch and an output terminal, comprising:

a first signal generating circuit for generating a signal intended for turning on the switch;

a second signal generating circuit for generating a signal intended for turning off the switch when current flowing via the inductor becomes larger than an instruction value determined based on an output voltage;

an offset circuit for providing an offset to at least one of input signals, which are compared by said second signal generating circuit, said providing of said offset being synchronized with a driving signal for controlling the switch.

2. The DC/DC converter according to claim 1, wherein said offset circuit stops providing the offset at the time or after the switch is turned on.

3. The DC/DC converter according to claim 1, wherein said offset circuit generates an offset for decreasing a voltage representing the electric current flowing via the inductor.

4. A DC/DC converter having a pair of switches which are alternately turned on and off so as not to be simultaneously ON, and an inductor arranged between the pair of switches and an output terminal, wherein the pair of switches is composed of a first switch for a current supply and a second switch for rectification, comprising:

a first circuit for turning off the second switch according to a set signal generated at predetermined intervals, and for turning on the first switch after a predetermined amount of time elapses from the timing when the second switch is turned off;

a second circuit for turning off the first switch when a current flowing via the inductor becomes larger than an instruction value determined based on an output voltage, and for turning on the second switch after a predetermined amount of time elapses from the timing when the first switch is turned off; and a third circuit for providing an offset to at least one of input signals, which are compared by said second circuit, said providing of said offset being synchronized with a driving signal for controlling the second switch.

5. The DC/DC converter according to claim 4, wherein said second circuit comprises a comparator for comparing a voltage representing the current flowing via the inductor with the instruction value; and said third circuit decreases the voltage representing the current flowing via the inductor from the timing when the first switch is turned off to the timing when the first switch is turned on.

6. A controlling circuit of a DC/DC converter, for controlling an output voltage of the DC/DC converter having a switch for supplying current and an inductor arranged between the switch and an output terminal, comprising:

a latch circuit for holding one of a first state for turning on the switch and a second state for turning off the switch;

a set signal generating circuit for generating a set signal intended for making said latch circuit enter the first state;

a reset signal generating circuit for generating a reset signal intended for making said latch circuit enter the second state when a current flowing via the inductor becomes larger than an instruction value determined based on an output voltage; and an offset circuit for providing an offset to at least one of input signals, which are compared by said reset signal generating circuit, in synchronization with a driving signal for controlling the switch.

7. A DC/DC converter having an inductor to which an input voltage is applied and a switch for storing energy in the inductor, comprising:

a first signal generating circuit for generating a signal intended for turning on the switch;

a second signal generating circuit for generating a signal intended for turning off the switch when a current flowing via the inductor becomes larger than an instruction value determined based on an output voltage; and an offset circuit for providing an offset to at least one of input signals, which are compared by said second signal generating circuit, said providing of said offset being synchronized with a driving signal for controlling the switch.

8. A method for controlling a DC/DC converter which has a switch and an inductor for storing energy, comprising:

generating a first signal intended for turning on the switch whereby the inductor stores energy;

generating, when current flowing via the inductor becomes larger than an instruction value determined based on an output voltage, a second signal intended for turning off the switch whereby the inductor release the energy; and providing an offset to at least one of input signals, which are compared in the step of generating the second signal, said providing of said offset being synchronized with a driving signal for controlling the switch.

* * * * *